US010113681B2

(12) United States Patent
Jansen et al.

(10) Patent No.: US 10,113,681 B2
(45) Date of Patent: Oct. 30, 2018

(54) PRESSURE COMPENSATED ENCLOSURES FOR SUBMERGED JOINTS

(71) Applicant: LOCKHEED MARTIN CORPORATION, Bethesda, MD (US)

(72) Inventors: Eugene C. Jansen, Stafford, VA (US); Trevor J. Owen, Vienna, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 903 days.

(21) Appl. No.: 14/270,773

(22) Filed: May 6, 2014

(65) Prior Publication Data

US 2014/0339810 A1 Nov. 20, 2014

Related U.S. Application Data

(60) Provisional application No. 61/824,048, filed on May 16, 2013.

(51) Int. Cl.
*F16L 58/18* (2006.01)
*F16L 1/12* (2006.01)

(52) U.S. Cl.
CPC .......... *F16L 58/187* (2013.01); *F16L 1/123* (2013.01); *F16L 58/181* (2013.01);
(Continued)

(58) Field of Classification Search
CPC ......... F16L 7/00; F16L 58/187; F16L 58/184; F16L 58/182; F16L 58/181; F16L 1/123
(Continued)

(56) References Cited

U.S. PATENT DOCUMENTS 1,821,274 A * 9/1931 Plummer ................ F16L 27/06
                                                        285/45
1,884,944 A * 10/1932 Williams ................ F16L 27/04
                                                        285/45
(Continued)

FOREIGN PATENT DOCUMENTS

CA   1199155      1/1986
CN   201129600   10/2008
(Continued)

OTHER PUBLICATIONS

International Search Report for international application No. PCT/US2014/037069, dated Sep. 8, 2014 (5 pages).
(Continued)

*Primary Examiner* — David Bochna
(74) *Attorney, Agent, or Firm* — Withrow & Terranova, PLLC

(57) ABSTRACT

Enclosures are described that encapsulate or surround a joint between two or more elements, for example two pipes or a pipe and a valve. The enclosures prevent direct contact between the joint and the surrounding water, for example fresh or salt water, and prevent biofouling and corrosion of the joint. An enclosure encapsulates the joint and forms an enclosed space around the joint. Some or all of the enclosure includes a flexible material. The enclosed space is filled with a protective liquid that is retained in the enclosed space and that will be in direct contact with the joint. Due to the flexible nature of the flexible material, the pressure inside the enclosed space is maintained substantially equal to the exterior pressure outside the membrane.

5 Claims, 5 Drawing Sheets

(52) U.S. Cl.
CPC ......... *F16L 58/182* (2013.01); *F16L 2201/40* (2013.01); *Y02E 10/34* (2013.01)

(58) Field of Classification Search
USPC .... 285/45, 96, 97, 104; 405/216, 215, 224.3
See application file for complete search history.

(56) References Cited

U.S. PATENT DOCUMENTS

| | | | | |
|---|---|---|---|---|
| 2,699,960 | A * | 1/1955 | Callery | F16L 23/167 285/45 |
| 3,122,158 | A * | 2/1964 | Grunsky | G01F 15/185 285/45 |
| 3,310,322 | A * | 3/1967 | Carroll | G01F 15/185 285/45 |
| 3,475,039 | A * | 10/1969 | Ortloff | E21B 17/015 285/45 |
| 3,719,049 | A * | 3/1973 | Shaw | B63B 59/00 405/216 |
| 3,811,713 | A * | 5/1974 | Barrett | F16L 27/1004 285/226 |
| 4,047,740 | A * | 9/1977 | Young | F16L 51/025 285/47 |
| 4,058,328 | A * | 11/1977 | Nickerson | F16L 51/025 285/45 |
| 4,081,599 | A * | 3/1978 | Cookson | H02G 5/063 285/226 |
| 4,180,101 | A * | 12/1979 | Wegge | F16L 7/00 138/103 |
| 4,183,556 | A | 1/1980 | Schwemmer | |
| 4,216,980 | A | 8/1980 | Shreve | |
| 4,283,078 | A * | 8/1981 | Ross | F16L 27/12 285/45 |
| 4,366,970 | A * | 1/1983 | Hogan, Jr. | E21B 33/03 285/45 |
| 4,457,517 | A | 7/1984 | Dunegan | |
| 4,796,668 | A | 1/1989 | Depret | |
| 5,133,578 | A | 7/1992 | Whightsil, Sr. et al. | |
| 5,312,137 | A * | 5/1994 | Nee | F16L 23/167 285/45 |
| 5,489,124 | A * | 2/1996 | Nee | F16L 23/167 285/45 |
| 5,527,070 | A * | 6/1996 | Blackwell | F16L 57/00 285/45 |
| 5,941,662 | A * | 8/1999 | Weaver | E02D 5/60 405/216 |
| 6,231,052 | B1 | 5/2001 | Forlander | |
| 6,244,290 | B1 * | 6/2001 | Reicin | F16K 27/12 285/45 |
| 2012/0193907 | A1 | 8/2012 | Skarbövig | |

FOREIGN PATENT DOCUMENTS

| | | |
|---|---|---|
| CN | 101435524 | 5/2009 |
| CN | 202419039 | 9/2012 |
| EP | 0272075 | 6/1988 |
| EP | 0296821 | 12/1988 |
| GB | 2356883 | 6/2001 |
| GB | 2444644 | 6/2008 |
| JP | 2011033172 | 2/2011 |
| WO | 93/24782 | 12/1993 |

OTHER PUBLICATIONS

Written Opinion for international application No. PCT/US2014/037069, dated Sep. 8, 2014 (6 pages).
C. Bennett, "New Field System Provides Pipe Joint Protection," found online at http://www.waterworld.com/articles/print/volume-17/issue-1/editorial-focus/new-field-system-provides-pipe-joint-protection.html; available as early as Apr. 3, 2013 (8 pages).
International Preliminary Report on Patentability for International Patent Application No. PCT/US2014/037069, dated Nov. 26, 2015, 8 pages.

* cited by examiner

PRESSURE COMPENSATED ENCLOSURES FOR SUBMERGED JOINTS

FIELD

This technical disclosure relates to pipe joints that are submerged in water, such as sea water, and protecting such joints from corrosion and biofouling.

BACKGROUND

Typical bolted joints do not stand up to a corrosive sea water environment well. Bolts, especially high strength bolts, corrode quickly and may fail. Bolts are usually unusable after extended submergence in sea water. Crevices in contact with sea water, especially when mating two surfaces of dissimilar materials, undergo severely accelerated corrosion. This is particularly concerning when the joint constitutes a major functional part of equipment that requires maintenance, such as pumps, heat exchangers and pressure vessels.

Sea water submerged pipe connections are typically welded to limit effects of corrosion. However, welding is a permanent connection, which must be destroyed in order to access equipment for service, maintenance and replacement. This is particularly concerning when the joint constitutes a major functional part of the equipment as in pumps, heat exchangers and pressure vessels. Some or all of this equipment must be scraped/rebuilt/recertified prior to reentry to service. For example, pressure vessels require certification to ASME BPV Section VIII whenever welding occurs at vessel connections. This requires an approved authority, time, money, test equipment and a suitable environment.

SUMMARY

Enclosures are described that encapsulate or surround a joint between two or more elements, for example two pipes or a pipe and a valve. Any joint could be protected by implementation of the concepts described herein, not limited to pipe or tube joints. Other fluid system component joints that could be protected include, but are not limited to, pressure vessel joints, pump joints, heat exchanger joints, instrumentation joints, filter joints, and the like.

The described enclosures prevent direct contact between the joint and the surrounding water, for example fresh or salt water, and prevent biofouling and corrosion of the joint. By protecting the joint as described herein, common attachment methods including, but not limited to, threaded, flanged, etc. can be used in submerged service in a corrosive fluid, especially salt water, without concern of direct contact with the corrosive fluid.

As used herein, the joint being submerged in water means that the joint is located under the water surface or within the water, but the joint is not in direct contact with the water.

In one embodiment, a flexible membrane is used to encapsulate the joint and form an enclosed space around the joint. The enclosed space is filled with a protective fluid that is retained in the enclosed space and that will be in direct contact with the joint. Any fluid that protects the joint and that can remain in prolonged exposure with the joint to extend the life of the joint compared to direct submersion of the joint in the corrosive fluid can be used. Examples of suitable protective fluids include, but are not limited to, non-electrically conductive liquids, such as a dielectric or otherwise non-electrically conductive liquids, grease, and fresh water. One example of a suitable non-electrically conductive liquid is a dielectric oil such as mineral oil. Due to the highly flexible nature of the membrane, the pressure inside the enclosed space is substantially equal to the exterior pressure outside the membrane.

In another embodiment, a protected submerged joint includes a first structure fastened to a second structure at a joint, where the joint is submerged in water. A flexible membrane is disposed over the joint, with the membrane having a first end connected to the first structure and a second end connected to the second structure, and the membrane defines an enclosed space surrounding the joint. A protective fluid is disposed within the enclosed space in an amount sufficient to cover the joint. In one embodiment, substantially the entire enclosed space is filled with the protective liquid. In another embodiment, a portion of the enclosed space is filled with the protective liquid, and some air remains in the enclosed space. Due to the flexible nature of the membrane, the pressure inside the enclosed space is substantially equal to the exterior pressure outside the membrane.

In another embodiment, a method of protecting a joint between a first structure and a second structure is provided, where the joint is submerged in water. The method includes disposing a flexible membrane over the joint with the membrane having a first end connected to the first structure and a second end connected to the second structure, and the membrane defining an enclosed space surrounding the joint. A protective liquid is introduced into the enclosed space in an amount sufficient to cover the joint. Due to the flexible nature of the membrane, the pressure inside the enclosed space is substantially equal to the exterior pressure outside the membrane.

A portion or majority of the enclosure could be made from non-flexible materials, with the remaining portion being made from flexible material so long as the flexible material is allowed to sufficiently deflect to equalize pressure from inside to outside. For example, in one embodiment, the flexible membrane spans only a portion of the joint and is secured between a pair of non-flexible portions that connect to the first and second structures. In another embodiment, the flexible membrane can be a flexible bladder that is fluidly connected to a generally rigid structure that encapsulates the joint.

Therefore, in another embodiment, a protected submerged joint includes a first structure fastened to a second structure at a joint, where the joint between the first structure and the second structure is submerged in a first fluid. An enclosure encapsulates the joint and defines an enclosed space surrounding the joint. The enclosure includes a flexible material, such as a portion of flexible material that bridges the joint or a flexible bladder. A protective liquid is disposed within the enclosed space in an amount sufficient to cover the joint. The flexible material can deflect to result in the pressure inside the enclosed space being substantially equal to the outside pressure.

The protective fluid could be clear and a portion of the enclosure, for example a portion of the flexible membrane and/or a portion of the non-flexible portion of the enclosure, could be made from clear material to allow visual inspection of the joint, as is often required with offshore structures and pressure vessels.

The described enclosures can be used to protect a submerged joint in any system including, but not limited to, Ocean Thermal Energy Conversion systems, offshore oil and gas systems, naval vessels, and submarines.

DRAWINGS

DETAILED DESCRIPTION

Figure 1:
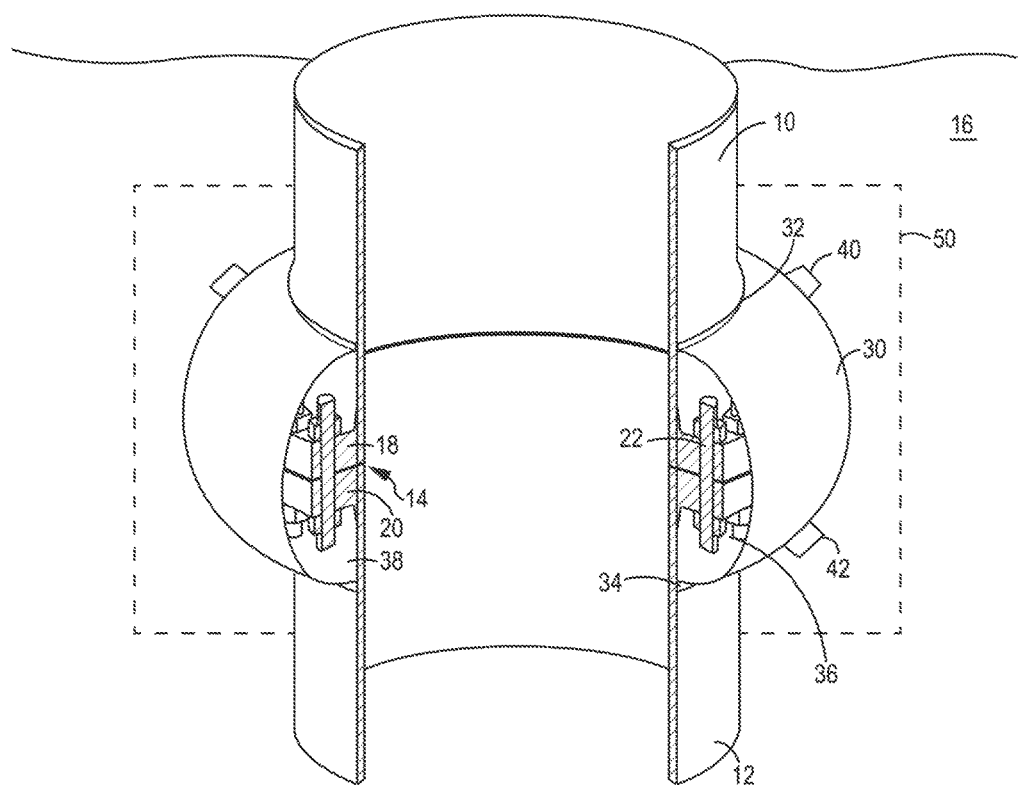
FIG. 1 illustrates one embodiment of a protected submerged joint described herein.
Figure 2:
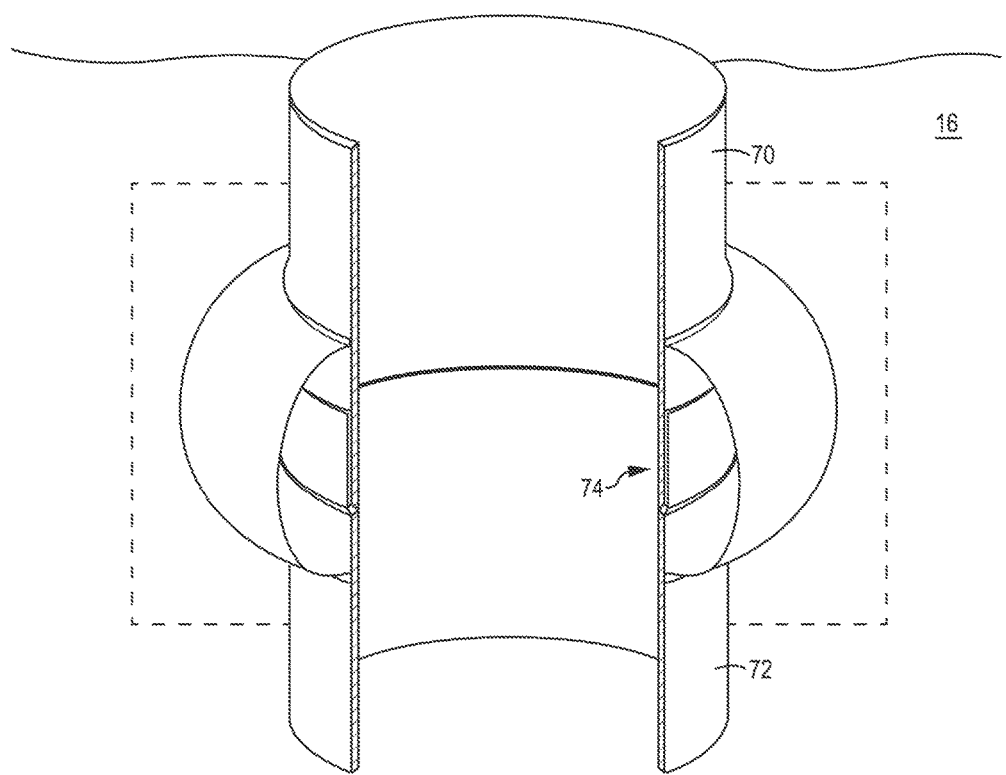
FIG. 2 illustrates another embodiment of a protected submerged joint described herein.

With reference to FIG. 1, a first structure 10 is shown connected to a second structure 12 at a joint 14 that is submerged in water 16. The joint 14 can be any type of joint that is suitable for connecting two or more structures. In the illustrated example, the structures 10, 12 have abutting circumferential flanges 18, 20 that are secured together via a plurality of bolts 22. A seal can be provided between the flanges 18, 20 if desired to help seal between the flanges. FIG. 2 illustrates an alternative embodiment that is substantially similar to FIG. 1, but where a first structure 70 is connected to a second structure 72 at a threaded joint 74. Other types of joint connections, including welded joints, can be used.

The water 16 can be fresh water, brackish water, salt water, or any other corrosive fluid environment that a joint may be submerged in.

The structures 10, 12 can be any structures that are connected to one another and submerged in a water environment and which one may want to protect the joint from corrosion and/or biofouling. For example, in the illustrated example, the structures 10, 12 are pipes. However, one structure can be a pipe and the other structure can be a non-pipe structure, for example a valve. Other fluid system component joints that could be protected include, but are not limited to, pressure vessel joints, pump joints, heat exchanger joints, instrumentation joints, filter joints, and the like.

If the structures 10, 12 are pipes, the pipes can carry a fluid, such as liquid or air. The fluid carried by the pipes can be at any positive or negative pressure. For example, the fluid carried by the pipes 10, 12 can be at a pressure greater than the exterior water 16 pressure. Or a vacuum can be drawn in the pipes.

A flexible membrane 30 is disposed over the joint 14 forming an enclosure. The membrane 30 has a first end 32 that is suitably connected to the first structure 10 on a first side of the joint and a second end 34 that is suitably connected to the second structure 12 on a second side of the joint. When connected, the membrane 30 helps to define an enclosed space 36 surrounding the joint 14.

The membrane 30 can be any flexible material that is impermeable to water. In one embodiment, the membrane is made of a polymeric material or an elastomeric material. In another embodiment, the membrane is made of polyurethane. In yet another embodiment, the membrane is made of a suitable water impermeable fabric.

The membrane can be a single/one-piece, integrally formed, unitary structure from the first end 32 to the second end 34, or the membrane can be formed by two or more pieces that are connected together so that the membrane surrounds the joint 14. In the illustrated example, the membrane is a single/one-piece, integrally formed, unitary structure that forms generally a half-toroid.

The ends 32, 34 of the membrane 30 can be connected to the structures 10, 12 in any manner such that the ends of the membrane 30 are sealed to the structures to prevent leakage past the ends during use. For example, the ends 32, 34 can be adhesively secured to the surfaces of the structures 10, 12, or the ends can be mechanically fastened to the structures using clamps or bands. Any suitable form of attachment can be utilized.

After the membrane 30 is secured to the structures 10, 12, a protective liquid 38 is introduced into the enclosed space 36 in an amount sufficient to cover the joint 14. The liquid 38 can be any liquid that protects the joint and that can be retained in the enclosed space 36 in prolonged direct contact with the structures 10, 12 and the joint 14. Examples of suitable liquids include, but are not limited to, non-electrically conductive liquids, such as a dielectric or otherwise non-electrically conductive liquids, grease, and fresh water. One example of a suitable non-electrically conductive liquid is a dielectric oil such as mineral oil. In one embodiment, the liquid 38 that is used has a specific gravity approximately equal to or equal to the water 16. When a vacuum is pulled in the structures 10, 12, the liquid 38 can be a liquid with a large molecular size and high surface tension, such as fresh water, so that contaminants are not drawn into the structures 10, 12 through small leaks.

In one embodiment, the protective liquid 38 is introduced into the space 36 through one or more sealable fill ports 40 formed on the membrane 30. After the space 36 is filled, the fill port(s) 40 is closed, for example using a cap or plug.

Due to the flexible nature of the membrane 30, the pressure inside the enclosed space 36 is substantially equal to the exterior pressure of the water 16 acting on the membrane 30. The flexible membrane 30 allows pressure to equalize from outside to inside to keep a near-zero pressure difference across the entire membrane including the sealed ends 32, 34 (and other seals if the membrane is composed of two or more portions). This allows the potential for loose tolerances and easier manufacture and installation.

If pressure from inside the structures 10, 12 leaks into the enclosed space 36 through the joint 14, as is common in high pressure vapor systems, one or more pressure relief valves 42 may be provided on the membrane 30 to allow trapped fluid to escape the enclosed space 36 without over-pressurizing the flexible membrane 30 to the point of total failure or excess release of the protective liquid 38. One of the pressure relief valves 42 can also be installed on the fill port 40.

During use, the membrane 30 may be exposed to local velocity flows of the water 16 or material in the water, such as currents, tidal flows, flows of sand, etc. Therefore, in one embodiment, a barrier 50 (illustrated diagrammatically in dashed lines in FIG. 1) can be located adjacent to or around the membrane to shield the membrane. The barrier 50 can take any form that is sufficient to shield the membrane from the local velocity flows in the water. The barrier 50 can shield a portion of the membrane or the entire membrane. The barrier 50 can be fixed to one or both of the structures 10, 12, or the barrier 50 can be fixed to a support structure that is separate from the structures 10, 12. However, the barrier 50 must allow sufficient exposure of the membrane 30 to local pressure and the barrier must not be a fully enclosed structure.

Figure 3:
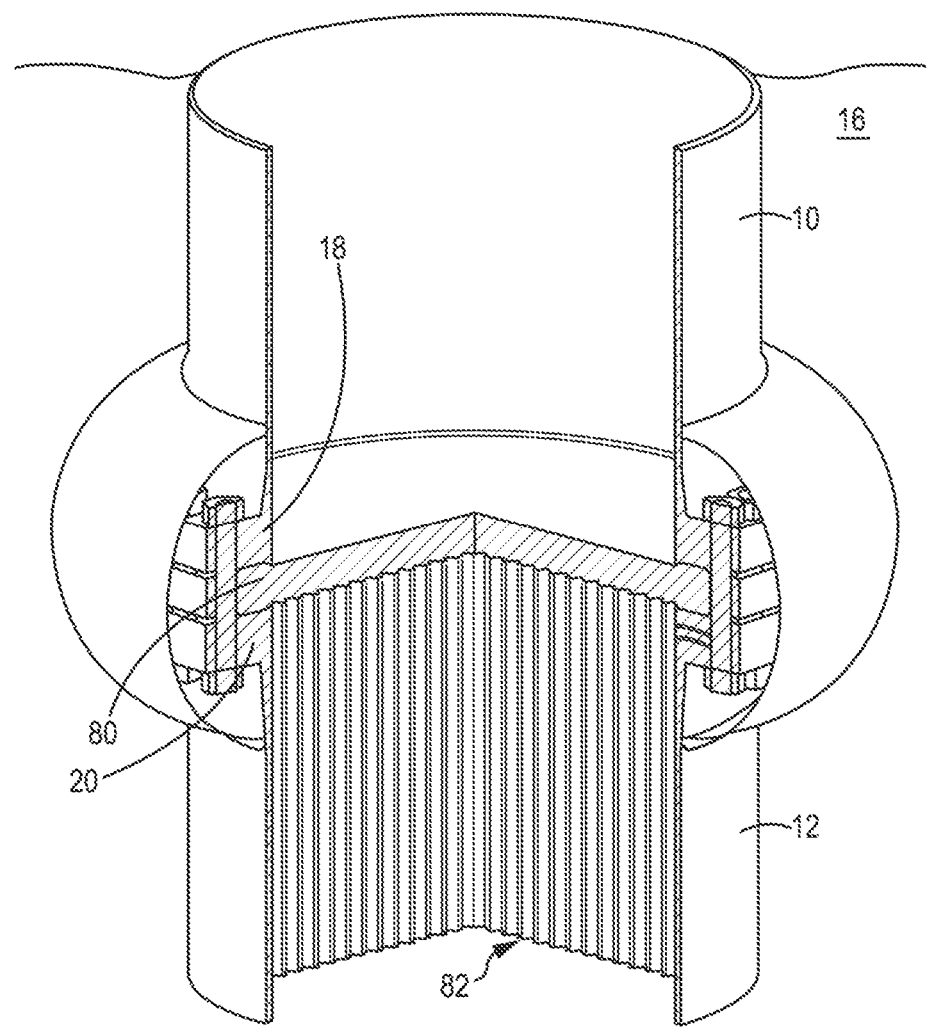
FIG. 3 illustrates another embodiment of a protected submerged joint described herein.

FIG. 3 illustrates an embodiment that is identical to FIG. 1, except that a tube sheet 80 of a shell and tube heat exchanger 82 is illustrated as being clamped between the flanges 18, 20. The heat exchanger 82 can be used in an Ocean Thermal Energy Conversion system, with the structures 10, 12 being pipes that convey, for example, cold water past the heat exchanger to condense a working fluid or warm water past the heat exchanger to evaporate a working fluid.

The enclosure that encapsulates the joint need not be formed entirely of the flexible membrane. However, some portion of the enclosure should include a flexible material where the flexibility allows the pressure inside the enclosed space being substantially equal to the exterior pressure outside the flexible membrane.

Figure 4:
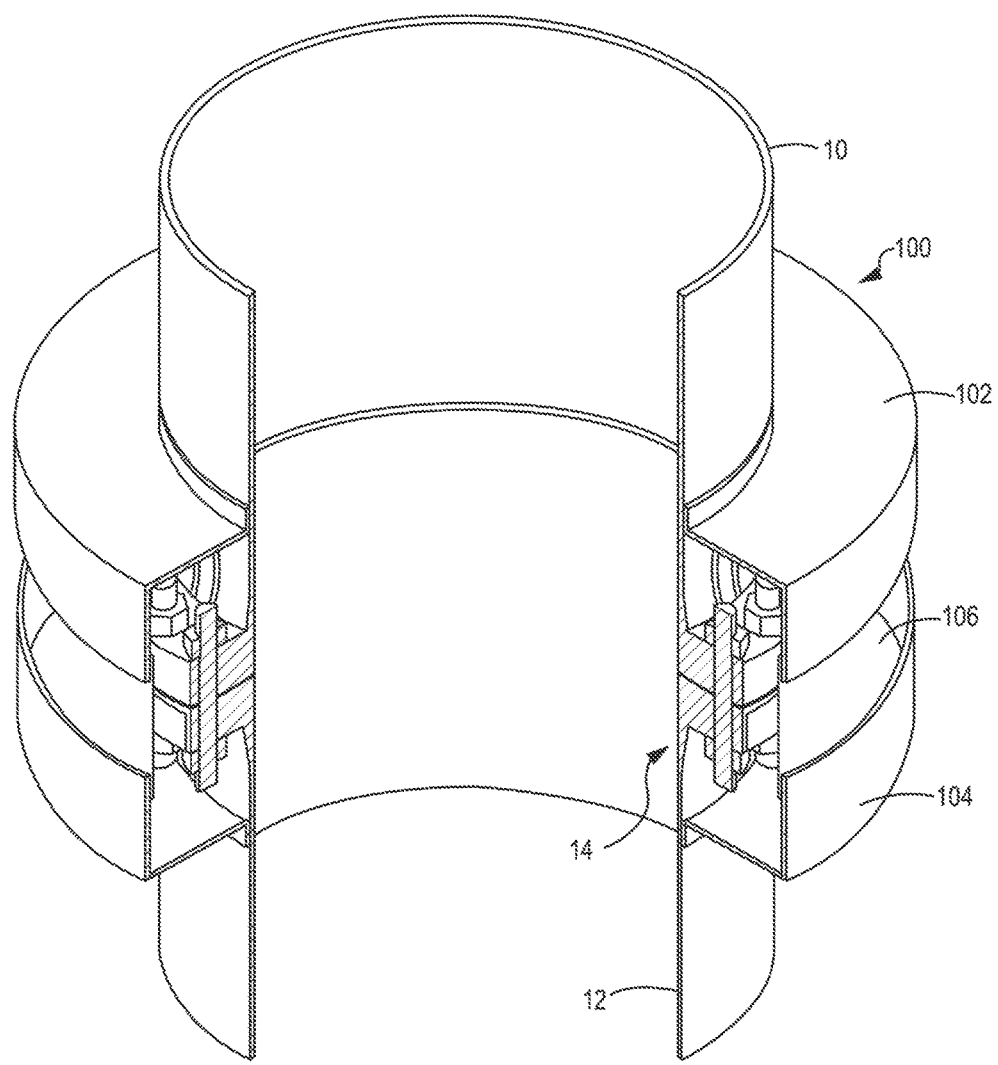
FIG. 4 illustrates another embodiment of a protected submerged joint described herein.

For example, FIG. 4 illustrates an embodiment where the joint 14 is encapsulated by an enclosure 100 that has substantially rigid end members 102, 104 and a flexible membrane 106 that extends between the end members 102, 104. The end members 102, 104 surround the pipes 10, 12 and are fixed to and sealed with the pipes. The end members 102, 104 can be formed from, for example, a non-flexible material such as a metal like steel, with the flexible membrane 106 bridging the gap between the end members 102, 104 so that an enclosed space is formed around the joint 14. The flexible nature of the membrane 106 permits the membrane 106 to deflect to result in the pressure inside the enclosed space being substantially equal to the outside pressure.

In one embodiment, a portion or the entirety of the flexible membrane 106 can be made transparent or be of sufficient transparency to permit visual inspection of the joint 14. In this embodiment, the protective liquid introduced into the enclosed space is also sufficiently transparent to permit viewing the joint through the protective liquid. Instead of making the flexible membrane transparent, a portion or the entirety of one or both of the end members 102, 104 could be made transparent to permit visual inspection of the joint.

Figure 5:
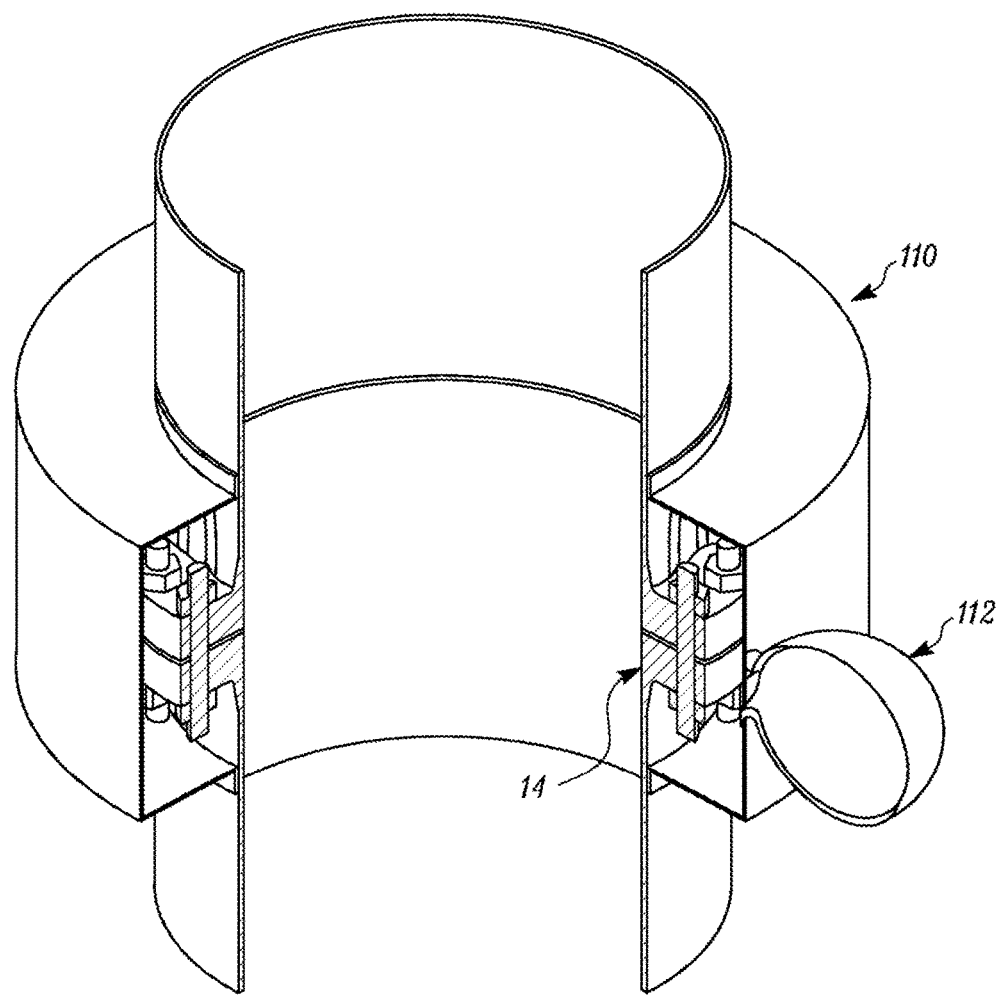
FIG. 5 illustrates another embodiment of a protected submerged joint described herein.

FIG. 5 illustrates an embodiment where the joint 14 is encapsulated by an enclosure 110 that is made almost entirely of non-flexible material, such as steel, and is substantially rigid. In this embodiment, the flexible material is formed by a flexible bladder 112 that is fixed to the enclosure 110 and is in fluid communication with the enclosed space defined by the enclosure. As the pressure within the enclosed space changes, the bladder expands and contracts due to the protective liquid being forced from the enclosed space and into the bladder 112, or from the bladder into the enclosed space. Therefore, the bladder 112 helps to ensure that the pressure inside the enclosed space is substantially equal to the outside pressure.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of protecting a joint between a first structure and a second structure, the joint being submerged in water, the method comprising:
    disposing an enclosure over the joint to define a watertight enclosed space surrounding the joint, the enclosure including a flexible material that is exposed to the watertight enclosed space and is exposed to an outside pressure;
    introducing a protective liquid within the watertight enclosed space through a sealable fill port on the flexible material in an amount sufficient to cover the joint; and
    closing the sealable fill port;
    wherein the flexible material can deflect to result in the pressure inside the watertight enclosed space being substantially equal to the outside pressure.

2. The method of claim 1, wherein the protective liquid comprises a non-electrically conductive liquid.

3. The method of claim 1, further comprising directly sealing a first end of the flexible material to the first structure and directly sealing a second end of the flexible material to the second structure.

4. The method of claim 1, further comprising securing first and second substantially rigid end members to the first and second structures, respectively, and connecting the flexible material between the first and second substantially rigid end members.

5. The method of claim 1, wherein the flexible material comprises a flexible bladder, and comprising fixing the flexible bladder to the enclosure so that the flexible bladder is disposed outside of the watertight enclosed space and is in fluid communication with the watertight enclosed space.

* * * * *